(12) United States Patent
Kim et al.

(10) Patent No.: US 10,606,399 B2
(45) Date of Patent: Mar. 31, 2020

(54) FLEXIBLE DISPLAY DEVICE

(71) Applicant: SAMSUNG DISPLAY CO., LTD., Yongin-si, Gyeonggi-do (KR)

(72) Inventors: Tae Sik Kim, Seoul (KR); Young Min You, Cheonan-si (KR); Dong Suk Choi, Suwon-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 59 days.

(21) Appl. No.: 14/981,278

(22) Filed: Dec. 28, 2015

(65) Prior Publication Data

US 2016/0306488 A1    Oct. 20, 2016

(30) Foreign Application Priority Data

Apr. 17, 2015    (KR) .......................... 10-2015-0054582

(51) Int. Cl.
*G06F 3/041*    (2006.01)
*G06F 1/16*    (2006.01)

(52) U.S. Cl.
CPC .......... *G06F 3/0416* (2013.01); *G06F 1/1626* (2013.01); *G06F 1/1637* (2013.01); *G06F 1/1643* (2013.01); *G06F 2203/04102* (2013.01); *G06F 2203/04103* (2013.01)

(58) Field of Classification Search
None
See application file for complete search history.

(56) References Cited

U.S. PATENT DOCUMENTS

| 6,392,143 B1* | 5/2002 | Koshio ................. H01L 21/563 174/528 |
| 6,885,157 B1* | 4/2005 | Cok ..................... G06F 3/0412 315/169.2 |
| 2002/0054261 A1* | 5/2002 | Sekiguchi ........... G02F 1/13338 349/122 |
| 2003/0124382 A1* | 7/2003 | Taguchi ................ C08G 61/12 428/690 |
| 2006/0193117 A1* | 8/2006 | Miyata ................ G02F 1/13452 361/749 |
| 2008/0106522 A1* | 5/2008 | Nishikawa .............. G06F 3/045 345/173 |
| 2009/0194342 A1* | 8/2009 | Kuo ..................... G06F 3/0412 178/18.03 |

(Continued)

FOREIGN PATENT DOCUMENTS

| KR | 10-2012-0029008 A | 3/2012 |
| KR | 10-2012-0054275 A | 5/2012 |
| KR | 10-2013-0071863 A | 7/2013 |

*Primary Examiner* — Dorothy Harris
(74) *Attorney, Agent, or Firm* — Lewis Roca Rothgerber Christie LLP

(57) ABSTRACT

A flexible display device according to an exemplary embodiment includes: a substrate; a touch panel on the substrate; a window layer on the touch panel; a flexible printed circuit (FPC) attached to an outer side of the window layer at a non-display area and comprising a driver integrated circuit (IC) configured to transfer a driving voltage to the touch panel and the substrate; a flexible printed circuit board (FPCB) attached to the FPC and configured to transfer a driving signal to the driver IC; and a bridge electrode at an outer side of the window layer at the non-display area and connecting the touch panel, the substrate, and the FPC.

10 Claims, 3 Drawing Sheets

(56) References Cited

U.S. PATENT DOCUMENTS

| | | | |
|---|---|---|---|
| 2009/0244028 A1* | 10/2009 | Matsuo | G06F 3/044 345/174 |
| 2010/0026659 A1* | 2/2010 | Long | B32B 17/10036 345/174 |
| 2010/0060601 A1* | 3/2010 | Oohira | G02F 1/133308 345/173 |
| 2010/0085326 A1* | 4/2010 | Anno | G06F 3/044 345/174 |
| 2010/0123675 A1* | 5/2010 | Ippel | G06F 3/044 345/173 |
| 2010/0321318 A1* | 12/2010 | Oohira | G06F 1/1643 345/173 |
| 2011/0012845 A1* | 1/2011 | Rothkopf | G06F 3/044 345/173 |
| 2011/0134056 A1* | 6/2011 | Kim | G06F 3/0412 345/173 |
| 2011/0141042 A1* | 6/2011 | Kim | G02F 1/13338 345/173 |
| 2011/0148777 A1* | 6/2011 | Meng | G06F 3/041 345/173 |
| 2011/0169759 A1* | 7/2011 | Wang | G06F 3/0416 345/173 |
| 2011/0234520 A1* | 9/2011 | Chan | G06F 3/041 345/173 |
| 2011/0304564 A1* | 12/2011 | Kim | G06F 3/044 345/173 |
| 2012/0009973 A1* | 1/2012 | Demuynck | H05K 1/183 455/550.1 |
| 2012/0098774 A1* | 4/2012 | Abe | G02F 1/133308 345/173 |
| 2012/0105344 A1* | 5/2012 | Ko | G06F 3/0412 345/173 |
| 2013/0016049 A1* | 1/2013 | Eom | H01L 27/323 345/173 |
| 2013/0021289 A1* | 1/2013 | Chen | G06F 1/1601 345/174 |
| 2013/0077005 A1* | 3/2013 | Kim | G02F 1/13452 349/40 |
| 2013/0106747 A1* | 5/2013 | Choi | G06F 3/041 345/173 |
| 2013/0147724 A1* | 6/2013 | Hwang | G06F 3/0412 345/173 |
| 2013/0147727 A1* | 6/2013 | Lee | G06F 3/0412 345/173 |
| 2013/0201114 A1* | 8/2013 | Guard | G06F 3/044 345/173 |
| 2013/0273315 A1* | 10/2013 | Mansky | H01B 7/00 428/138 |
| 2013/0278553 A1* | 10/2013 | Suzuki | G06F 3/044 345/174 |
| 2014/0042406 A1* | 2/2014 | Degner | H01L 27/326 257/40 |
| 2014/0049522 A1* | 2/2014 | Mathew | H05B 33/0896 345/204 |
| 2014/0055702 A1* | 2/2014 | Park | G02F 1/136286 349/43 |
| 2014/0063393 A1* | 3/2014 | Zhong | G02F 1/13306 349/42 |
| 2014/0230000 A1 | 8/2014 | Kotecha et al. | |
| 2014/0375907 A1* | 12/2014 | Wu | G06F 3/0412 349/12 |
| 2015/0092362 A1* | 4/2015 | Ahn | H05K 1/189 361/749 |
| 2015/0253882 A1* | 9/2015 | Lee | G06F 3/041 345/173 |
| 2015/0286315 A1* | 10/2015 | Chang | G06F 3/044 345/174 |
| 2015/0286325 A1* | 10/2015 | Kim | G06F 3/044 345/174 |
| 2016/0070376 A1* | 3/2016 | Lee | G06F 3/041 345/173 |
| 2016/0147326 A1* | 5/2016 | Ou Yang | G06F 3/041 345/174 |
| 2016/0306478 A1* | 10/2016 | Lai | G06F 1/1626 |
| 2017/0123570 A1* | 5/2017 | Maruyama | G06F 3/041 |

\* cited by examiner

FLEXIBLE DISPLAY DEVICE

CROSS-REFERENCE TO RELATED APPLICATION

This application claims priority to and the benefit of Korean Patent Application No. 10-2015-0054582 filed in the Korean Intellectual Property Office on Apr. 17, 2015, the entire content of which is incorporated herein by reference.

BACKGROUND

1. Field

Aspects of embodiments of the present invention relate to a flexible display device.

2. Description of the Related Art

A related art flexible display device may be manufactured using a flexible plastic substrate, such as a low temperature poly-silicon (LTPS), polyimide, and the like. A pixel array is formed on the flexible substrate, and the pixel array includes data lines and gate lines formed to cross each other, a thin film transistor (TFT), and a pixel electrode.

As shown in FIG. 5, a flexible printed circuit (FPC) 70, including a driver integrated circuit (IC) 90 that supplies a driving signal and a voltage to a pixel array, is connected to an outer edge of the flexible substrate 1. In this case, the driver IC 90 is formed of a gate driver IC and a data driver IC, and is formed using a chip on glass (COG) method, a chip on plastic (COP) method, or a chip on film (COF) method.

In addition, a flexible printed circuit board (FPCB) 60 including a driver circuit other than the driver IC 90 is connected to the flexible substrate 1 using the FPC 70. The driver IC 90 is connected to a pad formed in the flexible substrate 1 through a plurality of bumps, and supplies a driving voltage, a ground voltage, a data output signal, and an enable signal to a pixel array of the flexible substrate 1.

When the flexible display device is provided with a touch panel 6 as a functional layer, a touch panel FPC (TFPC) 80 in a pad portion at an end portion of a touch sensor of the touch panel 6 may be additionally connected to an FPC 70 through a connector 85.

In such a structure, a space for a pad portion for installation of the touch panel FPC 80 and a space for a non-display area in the window layer 8 for fixing of the touch panel FPC 80 may be present. In this case, the number of parts may increase and a high hardened part may be used, which may reduce flexibility of the flexible display device and increases the total thickness.

The above information disclosed in this Background section is only to enhance the understanding of the background of the invention, and therefore it may contain information that does not constitute prior art.

SUMMARY

Aspects of embodiments of the present invention relate to a flexible display device, and a flexible display device having a structure in which a flexible printed circuit board is connected to a window layer of a non-display area at an outer side of the flexible display device using a flexible printed circuit.

According to aspects of some example embodiments of the present invention, a flexible display device includes a touch panel, a substrate, and a bridge electrode connecting an FPC in a window layer in a non-display area, such that the size of the non-display area may be reduced and the number of parts may be reduced.

A flexible display device according to an example embodiment includes: a substrate; a touch panel on the substrate; a window layer on the touch panel; a flexible printed circuit (FPC) attached to an outer side of the window layer at a non-display area and comprising a driver integrated circuit (IC) configured to transfer a driving voltage to the touch panel and the substrate; a flexible printed circuit board (FPCB) attached to the FPC and configured to transfer a driving signal to the driver IC; and a bridge electrode at an outer side of the window layer at the non-display area and connecting the touch panel, the substrate, and the FPC, wherein the bridge electrode is connected with a first terminal at an outer side of the FPC, connected with a second terminal at an outer side of the touch panel, and a third terminal at an outer side of the substrate to supply the driving signal transmitted through the FPC from the FPCB to the touch panel and the substrate.

The bridge electrode may include a conductive metal.

The bridge electrode may include at least one of gold (Au), silver (Ag), copper (Cu), or indium tin oxide (ITO).

The first terminal to the third terminal may include a same material as the bridge electrode.

A height between the second terminal and the third terminal may be in a range of 250 nanometers to 350 nanometers.

The bridge electrode may be formed by being filled in a via hole of a black matrix (BM) printed layer at an outer side above the substrate.

The BM printed layer may include a same material as the window layer.

The first terminal to the third terminal may be electrically connected to the bridge electrode by an anisotropic conductive film (ACF).

The flexible display device may further include a polarization layer between a thin film encapsulation layer and the touch panel.

A display element layer on the substrate may include an organic light emitting element.

According to some example embodiments of the present invention, a touch panel FPC and a connector of the flexible display device may be omitted so that the size of the non-display area may be reduced and a bent area may be reduced.

Further, because a process for forming the touch panel FPC may be omitted, product flexibility and design variation may be improved, and the total thickness of the display device may be reduced.

DETAILED DESCRIPTION

Figure 1:
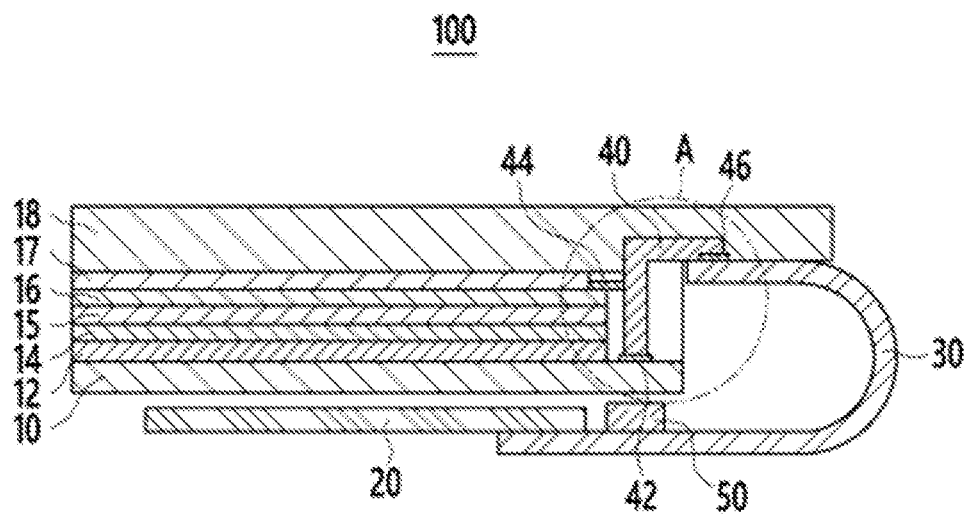
FIG. 1 is a schematic cross-sectional view of a flexible display device according to some example embodiments of the present invention.

Aspects of embodiments of the present invention will be described more fully hereinafter with reference to the accompanying drawings, in which example embodiments of the invention are shown. As those skilled in the art would realize, the described embodiments may be modified in various different ways, all without departing from the spirit or scope of the present invention.

Further, in example embodiments, because like reference numerals designate like elements having the same configuration, a first example embodiment is representatively described, and in other example embodiments, configurations that differ from the first example embodiment will be described. That is, some repetitive description of the same or similar features may be omitted for the sake of brevity.

It is noted that the drawings are schematic, and not illustrated in accordance with a scale. Relative dimensions and ratios of portions in the drawings are illustrated to be exaggerated or reduced in size for clarity and convenience in the drawings, and any dimensions are just example dimensions and are not limiting. In addition, like structures, elements, or components illustrated in two or more drawings use like reference numerals to show similar features. It will be understood that when an element such as a layer, film, region, or substrate is referred to as being "on" another element, it can be directly on the other element or intervening elements may also be present.

Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

It will be understood that when an element or layer is referred to as being "on," "connected to," or "coupled to" another element or layer, it can be directly on, connected to, or coupled to the other element or layer, or one or more intervening elements or layers may be present. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments only and is not intended to be limiting of the present invention. As used herein, the singular forms "a" and "an" are intended to include the plural forms as well, unless the context clearly indicates otherwise. It will be further understood that the terms "comprises," "comprising," "includes," and "including," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list.

As used herein, the term "substantially," "about," and similar terms are used as terms of approximation and not as terms of degree, and are intended to account for the inherent deviations in measured or calculated values that would be recognized by those of ordinary skill in the art. Further, the use of "may" when describing embodiments of the present invention refers to "one or more embodiments of the present invention." As used herein, the terms "use," "using," and "used" may be considered synonymous with the terms "utilize," "utilizing," and "utilized," respectively. Also, the term "exemplary" is intended to refer to an example or illustration.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

The example embodiment shows an example embodiment in detail. As a result, various modifications of the described embodiments are still within the spirit and scope of the present invention. Therefore, the example embodiments are not limited to a specific aspect of an illustrated region, and for example, includes modifications made for manufacturing.

Hereinafter, a flexible display device according to an example embodiment will be described with reference to FIG. 1 and FIG. 2.

Figure 2:
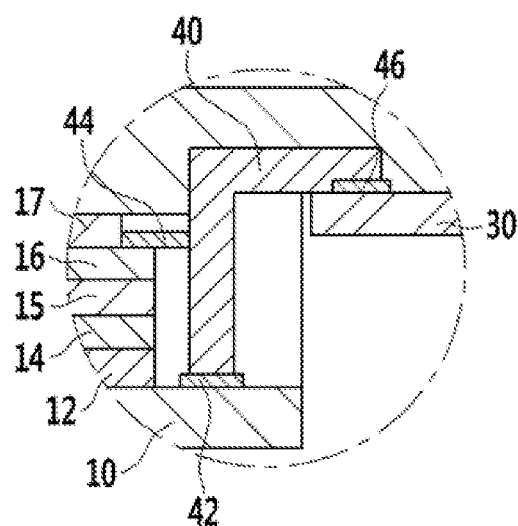
FIG. 2 is an enlarged view of the part "A" of FIG. 1.

FIG. 1 is a schematic cross-sectional view of a flexible display device according to an example embodiment, and FIG. 2 is an enlarged view of the part "A" of FIG. 1.

Referring to FIG. 1 and FIG. 2, a flexible display device according to an example embodiment includes a substrate 10, a display element layer formed on the substrate 10 and including a plurality of pixels, a thin film encapsulation layer 12 covering the display element layer for protection, a touch panel 16 formed on the thin film encapsulation layer 12, and a window layer 18 formed on the touch panel 16. In addition, a flexible printed circuit (FPC) attached to an outer side of the window layer 18 is provided in the non-display area of the substrate 10, and a flexible printed circuit board (FPCB) 20 is attached to the FPC 30. In the FPC 30, a driver integrated chip (IC) transferring a driving voltage to the touch panel 16 and the substrate 10 is formed.

The substrate 10 may be formed by coating a plastic material such as a low temperature poly silicon (LTPS), polyimide, and the like, such that the substrate 10 has flexibility.

The display element layer includes an element region where an active element such as a thin film transistor (TFT) is formed and a light emission region where an emission layer is formed. The element region and the light emission region may be separated from each other or may overlap each other. The display element layer may include an organic light emitting display element. A pixel array is formed on the display area. The pixel array includes a plurality of data lines and a plurality of gate lines that alternately cross each other, a thin film transistor, and a pixel electrode.

The thin film encapsulation layer is formed on the display element layer, and faces opposite to the substrate 10. The thin film encapsulation layer may prevent or reduce instances of oxygen and moisture entering from the outside to protect the display element layer.

The window layer 18 is formed on the thin film encapsulation layer 12, and may be made of polyimide (PI) or polyethylene terephthalate (PET). The window layer 18 may be attached to the thin film encapsulation layer 12 by an adhesive layer 17 such as a pressure sensitive adhesive PSA. Further, when the display device further includes a functional layer such as a polarization layer 14, a touch panel 16, and the like, the window layer 18 may be attached to the functional layer by the adhesive layer 17.

The FPC 30 is provided with a driver IC 50 attached to an outer side of the window layer 18 in the non-display area for transmitting a driving voltage to the touch panel 16 and the substrate 10. The driver IC 50 is where a circuit chip is installed, and a driving signal input from the FPCB 20 is transferred through the FPC 30, converted in the driver IC 50, and then supplied to a display portion of the substrate 10.

The FPCB 20 is attached to the FPC 30 at the opposite side of a portion attached to the outer side of the window layer 18, and it transfers a driving signal to the driver IC 50 through the FPC 30.

Meanwhile, a bridge electrode 40 is formed at the outer side of the window layer 18 in the non-display area. The bridge electrode 40 is formed at the outer side of the window layer 18 and electrically connected to the FPC 30, the touch panel 16, and the substrate 10. A first terminal 42 is formed at the outer side of the substrate 10 where the bridge electrode 40 is connected, a second terminal 44 is formed at the outer side of the touch panel 16 where the bridge electrode 40 is connected, and a third terminal 46 is formed at the outer side of the FPC 30 where the bridge electrode 40 is connected.

The first terminal 42 to the third terminal 46 may be electrically connected to the bridge electrode 40 through an anisotropic conductive film (AFC). An AFC is filled between the terminals 42, 44, and 46 and then cured such that the bridge electrode 40 and the first to third terminals 42, 44, and 46 can be electrically connected to each other. The AFC may include a polymer and a conductive particle included in the polymer, and the conductive particles are arranged between the bridge electrode 40 and the terminals 42, 44, and 46, such that the bridge electrode 40 and the first to third terminals 42, 44, and 46 can be electrically connected to each other.

The bridge electrode 40 may be made of a conductive metal, and may be made of one of gold (Au), silver (Ag), copper (Cu), and indium tin oxide (ITO). In addition, the first to third terminals 42 to 46 may be made of the same material as the bridge electrode 40.

The bridge electrode 40 may be formed in a bent shape throughout the inside of the window layer 18 and a black matrix (BM) printed layer on the non-display area of the substrate 10. An upper side of the bridge electrode 40 is included in the window layer 18, and a lower column portion of the bridge electrode 40 may be included in the BM printed layer. The BM printed layer may be made of the same material as the window layer 18. After the thin film encapsulation layer 12 and the touch panel 16 are formed on the substrate 10, the BM printed layer is formed in the non-display area at the outer side of the substrate 10, and after a via hole is formed in the BM printed layer, a conductive metal is filled in the via hole such that the bridge electrode 40 can be formed.

The height between the second terminal 44 and the third terminal 46 may be between about 250 nanometers (nm) to about 350 nm. The height between the second terminal 44 and the third terminal 46 may be adjusted by changing the thickness of the functional layer such as the polarization layer 14, the touch panel 16, and the like and the adhesive layers 15 and 17 therebetween, and to realize slimness of the display device, the height may be between about 250 nm to about 350 nm.

Meanwhile, the flexible display device 100 according to the example embodiment may further include a functional layer between the thin film encapsulation layer 12 and the window layer 18, and may include the polarization layer 14 as a functional layer. The polarization layer 14 may be formed between the thin film encapsulation layer 12 and the touch panel 16. The polarization layer 14 may enable a flexible characteristic, reduce the thickness of the display device 100, and at the same time, improve visibility of an image displayed in the display device 100. Further, as a functional layer, a phase delay film may be included. The phase delay film may be a $\lambda/4$ phase delay film, and it serves to circularly polarize linearly polarized light or linearly polarize circularly polarized light.

Figure 3:
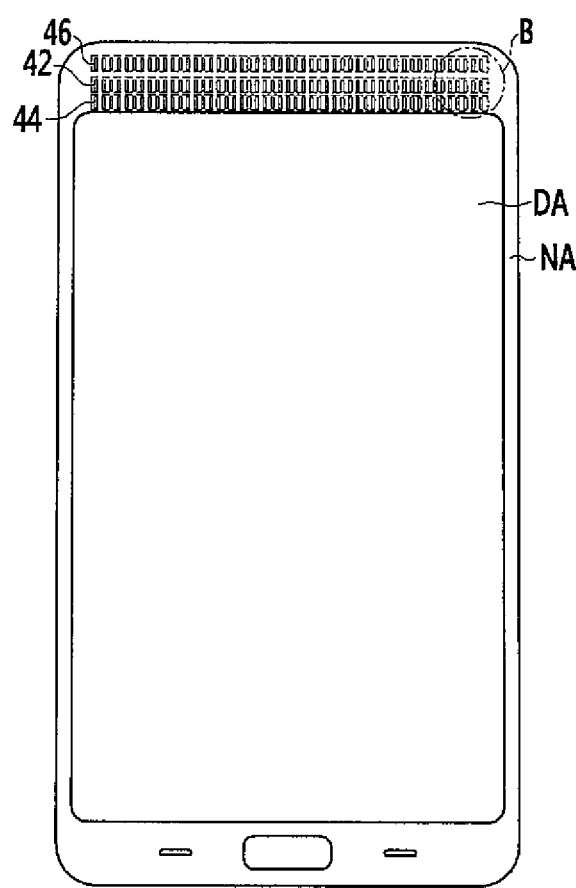
FIG. 3 is a schematic top plan view of a flexible display device according to some example embodiments of the present invention.
Figure 4:
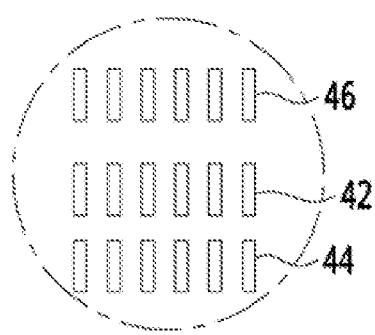
FIG. 4 shows an enlarged view of the part "B" of FIG. 3.
Figure 5:
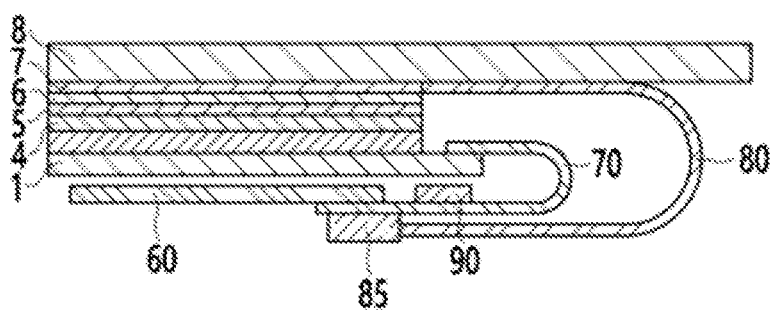
FIG. 5 is a schematic cross-sectional view of a related art flexible display device.

FIG. 3 is a schematic top plan view of a flexible display device according to an exemplary embodiment, and FIG. 4 is an enlarged view of part "B" of FIG. 3.

Referring to FIG. 3 and FIG. 4, a flexible display device 100 is divided into a display area DA and a non-display area NA, and a first terminal 42 to a third terminal 46 are formed in the non-display area NA. When viewed on a plane, the third terminal 46 is formed at the outermost side of an FPC 30, and thus is electrically connected to a bridge electrode 40 in the non-display area NA, and the second terminal 44 is formed at the outermost side of a touch panel 16, and thus is electrically connected to the bridge electrode 40 in the display area DA. The first terminal 42 is formed at the outer side of the substrate 10, and thus is electrically connected to the bridge electrode 40, and it is located between the second terminal 44 and the third terminal 46 when viewed on a plane. The bridge electrode 40 is provided in a plurality, and one bridge electrode 40 is provided in each group formed of first and third terminals 42 to 46 arranged in one row in the drawing.

As described, in the flexible display devices according to the example embodiments, a touch panel FPC and a connector are omitted such that a non-display area can be reduced and a bending area can be reduced.

Further, a process for forming a touch panel FPC is omitted, and product flexibility and design variation can be improved by reducing the number of parts, and accordingly a total thickness of the display device can be reduced.

While this disclosure has been described in connection with what is presently considered to be practical example embodiments, it is to be understood that the invention is not limited to the disclosed embodiments, but, on the contrary, is intended to cover various modifications and equivalent arrangements included within the spirit and scope of the appended claims, and their equivalents.

| Description of Some of the Symbols | |
|---|---|
| 100: flexible display device | 10: substrate |
| 12: thin film encapsulation layer | 14: polarization layer |
| 15, 17: adhesive layer | 16: touch panel |
| 18: window layer | 20: FPCB |
| 30: FPC | 40: bridge electrode |
| 42: first terminal | 44: second terminal |
| 46: third terminal | 50: driver IC |
| DA: display area | NA: non-display area |

What is claimed is:

1. A flexible display device comprising:
a substrate on which a display element layer including a plurality of pixels is disposed;
a thin film encapsulation layer covering the display element layer for protection;
a touch panel on the thin film encapsulation layer;
a window layer on the touch panel such that the window layer is located above a front surface of the substrate;
a flexible printed circuit (FPC) attached to the window layer;
a flexible printed circuit board (FPCB) attached to the FPC; and
a plurality of bridge electrodes electrically connecting the FPC to the touch panel or the substrate,
wherein the window layer comprises an extension portion which does not overlap the substrate,
the FPC comprises a first end connected to the bridge electrodes at the extension portion of the window layer and a second end connected to the FPCB, and
the FPC is bent to a rear surface of the substrate, opposite the front surface of the substrate, so that the FPCB is disposed on the rear surface of the substrate.

2. The flexible display device of claim 1, wherein the bridge electrodes comprise a conductive metal.

3. The flexible display device of claim 2, wherein the bridge electrodes comprise at least one of gold (Au), silver (Ag), copper (Cu), or indium tin oxide (ITO).

4. The flexible display device of claim 1, wherein the bridge electrodes are connected to a first terminal on the substrate, a second terminal at an outer side of the touch panel, and a third terminal on the window layer, and
the first terminal, the second terminal, and the third terminal comprise a same material as the bridge electrodes.

5. The flexible display device of claim 4, wherein a height between the second terminal and the third terminal is in a range of 250 nanometers to 350 nanometers.

6. The flexible display device of claim 4, wherein the first terminal, the second terminal, and the third terminal are electrically connected to the bridge electrodes by an anisotropic conductive film (ACF).

7. The flexible display device of claim 1, wherein the bridge electrodes are formed by being filled in a via hole of a black matrix (BM) printed layer at an outer side above the substrate.

8. The flexible display device of claim 7, wherein the BM printed layer comprises a same material as the window layer.

9. The flexible display device of claim 1, further comprising a polarization layer between a thin film encapsulation layer and the touch panel.

10. The flexible display device of claim 1, wherein the display element layer comprises an organic light emitting element.

* * * * *